United States Patent [19]

Martin

[11] 3,960,575

[45] June 1, 1976

[54] DETERGENT RESISTANT POLISH COMPOSITIONS

[75] Inventor: Eugene Ray Martin, Onsted, Mich.

[73] Assignee: SWS Silicones Corporation, Adrian, Mich.

[22] Filed: Nov. 11, 1974

[21] Appl. No.: 522,661

[52] U.S. Cl............................ 106/10; 106/11; 106/271; 106/287 SB; 260/28 R; 260/29.2 M; 260/33.6 SB; 260/33.8 SB; 260/448.2 N
[51] Int. Cl.$^2$............................................ C09G 1/08
[58] Field of Search............ 106/10, 3, 271, 287 SB, 106/11; 260/448.2 N, 28, 29.2 M, 33.6 SB, 33.8 SB

[56] References Cited
UNITED STATES PATENTS

| | | | |
|---|---|---|---|
| 3,045,036 | 7/1962 | Jex et al. | 106/287 SB |
| 3,344,066 | 9/1967 | Schiefer et al. | 252/28 |
| 3,508,933 | 4/1970 | Yates | 106/10 |
| 3,817,889 | 6/1974 | Fink et al. | 106/10 |

*Primary Examiner*—Lorenzo B. Hayes

[57] ABSTRACT

Improved detergent resistant polish compositions can be prepared by adding novel aminofunctional silicon fluids obtained from an equilibration process to conventional polish compositions. Polishes having improved rub-out and gloss may be obtained by adding the aminofunctional silicon fluid and hydroxyl-terminated organopolysiloxanes and/or silicone resins to the polish compositions.

11 Claims, No Drawings

DETERGENT RESISTANT POLISH COMPOSITIONS

This invention relates to polish compositions and more particularly to improved polish compositions which are resistant to detergents.

Detergent resistant polishes based on waxes dissolved in a solvent or in the form of aqueous emulsions and containing organopolysiloxanes having amine groups linked thereto are well known in the art. For example, U.S. Pat. No. 3,508,933 to Yates describes an automobile polish which contains the reaction product of a hydroxylend-blocked polydimethylsiloxane and an aminoalkoxysilane. Also, U.S. Pat. No. 3,544,498 to Holdstock et al describes a detergent polish containing a partial amine salt of a copolymer which is obtained from the partial hydrolysis and condensation of a silane end-blocked polydimethylsiloxane having 5 siloxy units, an aminoalkyltrialkoxysilane and an aminoalkoxyalkyltrialkoxysilane and a copolymer obtained from the partial hydrolysis and condensation of a silanol end-blocked polydimethylsiloxane having 800 dimethylsiloxy units with an aminoalkoxyalkenyltrialkoxysilane.

Likewise, polish compositions containing mixtures of hydroxyl-terminated organopolysiloxanes and organopolysiloxanes containing amine groups, have been known and described in the art. For example, U.S. Pat. No. 3,817,889 to Fink et al describes a detergent resistant composition containing hydroxyl-terminated organopolysiloxanes and methylsiloxanes having amine groups linked to the silicon atoms of the organopolysiloxane through an oxygen atom.

It has been discovered that organopolysiloxanes containing amine groups which are linked to the silicon atom of the organopolysiloxane through an oxygen atom are susceptible to hydrolysis and condensation and when employed in conventional polish compositions, do not provide a polish having the desired resistance to detergents. Moreover, it has been discovered that when an aminofunctional silicon fluid obtained from the equilibration of a cyclic siloxane and an aminofunctional silicon compound in the presence of a basic catalyst is incorporated into a polish composition, substantial detergent resistance is imparted to the resultant composition. Also, when these aminofunctional silicon fluids are combined with hydroxyl-terminated organopolysiloxanes and/or silicone resins and incorporated in polish compositions improved rub-out and improved gloss along with improved detergent resistance is imparted thereto.

Therefore, it is an object of this invention to provide polish compositions having improved detergent resistance. Another object of this invention is to provide a polish composition having improved rub-out properties, i.e., the ease with which the polish composition can be spread upon a surface to be treated and rubbed to a nonstreaked condition. Still another object of this invention is to provide a high gloss surface. A further object of this invention is to provide a detergent resistant composition containing an aminofunctional silicon fluid which is stable to hydrolysis and condensation.

These and other objects which will become apparent from the following description are accomplished in accordance with this invention, generally speaking, by incorporating an aminofunctional silicon fluid into a wax containing polish composition.

In still another embodiment, the aminofunctional silicon fluid and a hydroxyl-terminated organopolysiloxane and/or a silicone resin may be added to a wax containing polish composition to impart improved detergent resistance, improved rub-out properties and improved gloss thereto.

The aminofunctional silicon compounds employed in this composition may be prepared by mixing an organopolysiloxane with aminofunctional silanes or siloxanes and thereafter equilibrating the mixture in the presence of a catalyst. Organopolysiloxanes which may be used in the preparation of these aminofunctional silicon compounds are cyclic siloxanes of the general formula

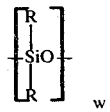

wherein the R(s), which may be the same or different, represent monovalent hydrocarbon radicals having from 1 to 18 carbon atoms, and w is a number of from 3 to 10.

Examples of suitable cyclic organopolysiloxanes which may be used in the formation of these aminofunctional silicon compounds are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which w has a value of from 3 to 4 are preferred.

The aminofunctional silanes or siloxanes which are reacted with the cyclic organopolysiloxanes may be represented by the general formula

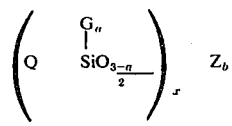

wherein G represents the radicals, R, OR', OR''NR'$_2$, or OSiR$_3$ in which R is the same as R above, R' represents hydrogen or monovalent hydrocarbon radicals having from 1 to 18 carbon atoms, R'' is a substituted or unsubstituted divalent hydrocarbon radical having from 1 to 18 carbon atoms, a substituted or unsubstituted divalent hydrocarbonoxy radical in which the oxygen is in the form of an ether linkage or an unsaturated divalent hydrocarbon radical, Q represents the radicals

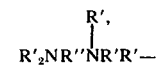

and

Z is a radical selected from the group consisting of R'O$_{0.5}$, R$_3$SiO$_{0.5}$ and R'$_2$NR''O$_{0.5}$ in which R, R' and R'' are the same as above, a is a number of from 0 to 2, b is a number of from 0 to 3 and $x$ is a number of from 1 to 20,000.

Examples of suitable divalent radicals represented by R'' are hydrocarbon radicals having from 1 to 18 carbon atoms such as ethylene, trimethylene, tetramethylene, hexamethylene, octamethylene; hydrocarbonoxy radicals having the formula

in which $r$ is a number of from 1 to 50 such as ethylene oxide, trimethylene oxide and polymers thereof and alkenylene radicals such as vinylene, propenylene, butenylene, hexenylene and the like.

Examples of suitable aminofunctional silanes are B-aminopropyltriethoxysilane, r-aminopropyltrimethoxysilane, methyl-B-(aminoethyl) r-aminopropyldimethoxysilane, omega-aminohexyltributoxysilane, B-(aminoethoxy) propyltrimethoxysilane, B-(aminoethoxy) hexyltriethyoxy silane, B-(aminopropoxy) butyltributoxysilane, methyl-B-(aminopropoxy) propyldi-(aminoethoxy) silane,

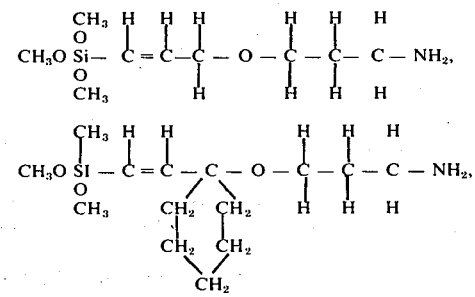

and the like.

Representative examples of aminofunctional siloxanes are

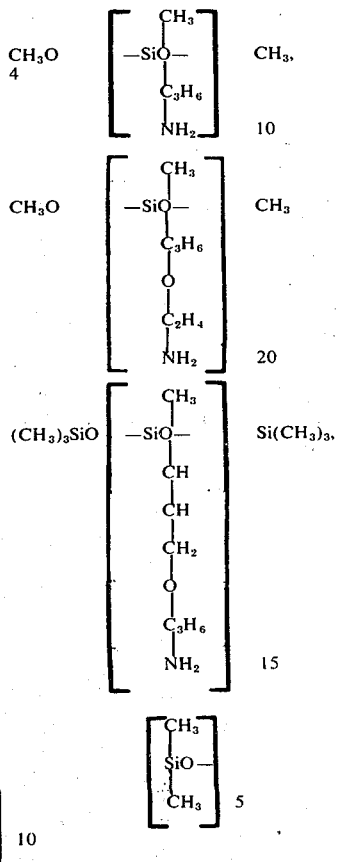

$Si(CH_3)_3$ and the like.

The aminofunctional silicon compounds are prepared by equilibrating a mixture containing an aminofunctional silane or siloxane and organopolysiloxanes in the presence of a base catalyst.

Catalysts which may be employed in the equilibration reaction are bases such as hydroxides, e.g., sodium hydroxide, potassium hydroxide, cerium hydroxide, tetramethylammonium hydroxide and the like; alkali metal alkoxides, e.g., sodium butoxide and the like; alkali metal hydrides, e.g., sodium hydride and the like; silanolates, e.g., potassium silanolate, tetramethylammonium silanolate and the like; alkali metal alkyls, e.g., ethylsodium; alkali metal alkenyls; alkali metal aryls, e.g., biphenyl sodium, potassium naphthalene and the like. Even though other catalysts may be used, it is preferred that alkali metal hydroxides be employed in the equilibration reaction.

Although the amount of catalyst is not critical, it is preferred that from 0.0001 percent up to about 10 percent by weight of catalyst based on the weight of the aminofunctional silane or siloxane be employed to effect equilibration.

Generally, it is desirable to remove or destroy the catalysts after equilibration because their presence will adversely affect the properties of the resulting polymer. The catalysts may be removed, for example, by washing the water or they may be destroyed by neutralizing with acidic reagents. In addition, certain catalysts may be destroyed by heating the reaction mixture to an elevated temperature after the equilibration reaction is completed.

The equilibration reactions may be conducted at any temperature ranging from about 25°C. up to about 200°C. over a period of time ranging from 0.5 hours up to several days in the presence or absence of a solvent. It is preferred that the equilibration reaction be conducted in an inert atmosphere.

Generally, it is preferred that the equilibration be conducted in the absence of a solvent; however, when lithium containing catalysts are used, then it is preferred that the equilibration be conducted in the presence of "aprotic" solvents.

The term "aprotic solvent" is intended to mean any organic solvent which is free of active protons. These may include such solvents as various tertiary amines such as triethylamine, tributylamine, pyridine and the like. Other suitable solvents are dimethyl sulfoxides, dioxane, alkyl ethers; glycols such as diethylene glycol diethyl ether, diethylene glycol dimethyl ether, diethoxyethane, tetrahydrofuran and the like. These solvents are chosen such that their electron donating centers are capable of forming a coordination complex with the cation, thereby increasing its reactivity towards the diorganocyclosiloxane. Aprotic solvents which have Lewis base characteristics are preferably employed because of their ability to donate electrons to the cation, thereby coordinating with the cation and enhancing its reactivity by virtue of such coordination.

Certain other hydrocarbon aprotic systems which do not coordinate with the cation may be employed with the aprotic solvents described above to provide more intimate contact between the reactants. Examples of suitable hydrocarbon aprotic solvents are heptane, benzene, toluene, xylene and the like. It is preferred that from 0.05 to about 10 percent of an aprotic solvent having a Lewis base characteristic be employed and the remainder of the solvent may be selected from the hydrocarbon aprotic solvents.

The aminofunctional silicon fluids described above may be incorporated in wax containing polish compositions to provide a detergent resistant polish or the aminofunctional silicon fluid and a hydroxyl-terminated organopolysiloxanes may be incorporated in a wax containing polish composition to impart detergent resistance thereto.

These hydroxyl-terminated organopolysiloxanes may be represented by the general formula

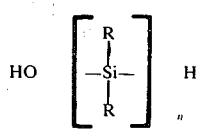

in which the R(s) are the same as above and $n$ is a number greater than 4.

Radicals represented by R above are alkyl radicals, e.g., methyl, ethyl, propyl, butyl, octyl, dodecyl and octadecyl; arylradicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, alpha-phenylethyl, beta-phenylethyl and alpha-phenylbutyl and the like.

The organopolysiloxane may be any linear or branched chained compound having an average of from 1.75 to 2.25 organic radicals per silicon atom. The organopolysiloxane may have a small number of molecules having only one hydroxyl group or there may be a small number of molecules carrying an excess of two hydroxyl; however, these are generally present as impurities. In general, the polysiloxane fluids should have a viscosity of between about 50 cs. and 1,000,000 cs., and more preferably between about 100 cs. and 300,000 cs., at 25°C.

The amount of aminofunctional silicon fluid that can be added to a wax containing polish composition will vary. Generally speaking, however, at least 1 percent by weight based on the weight of the wax containing composition is usually necessary to obtain reasonable detergent resistance and it is preferred to use up to about 5 percent. While larger quantities, say up to about 15 percent by weight or more can be used, it is preferred that from from 2 to 10 percent be used. Basically, the amount of reaction product used is primarily dependent on the amount of wax in the composition.

When hydroxyl terminated organopolysiloxanes are incorporated in the wax containing composition, the amount will vary from about 1 to about 30 percent by weight based on the weight of the compositon. Generally, it is preferred that the wax composition contain from about 2 to 25 percent by weight and more preferably from about 5 to 15 percent of the hydroxyl terminated organopolysiloxane fluid.

The aminofunctional silicon fluids described herein can be incorporated in any standard type of automobile polish, i.e., solvent based polishes, aqueous emulsion type polishes or paste wax polishes to provide a stable detergent resistant composition.

Any of the waxes used heretofore in polish compositions may be used in the compositions of this invention. These include, for example, montan wax, carnauba, candellilla, ouricury, beeswax and synthetic waxes such as ozakinte, polyethylene waxes and paraffin waxes including microcrystalline and oxidized paraffins. In general, it is preferred that a wax be present in an amount of from 2 to 10 percent by weight. It will, of course, be apparent that not all of the wax need be only of one kind in any specific composition.

If necessary, the polish composition may contain up to 5 percent by weight of an emulsifying agent. The need for this will depend on the nature of the constituents and whether the composition is to be a solvent dispersion or an emulsion. Any of the emulsifying agents used heretofore in polish compositions may be used, such as, for example, morpholine oleate, triethanolamine stearate, amino acetates, sorbitan fatty acid esters, the alkylaryl polyether alcohols and the ethylene oxide condensation products of alkylated phenols.

One or more of the conventional thickening agents may be employed, if desired. These are, of course, not necessary where the composition is a solvent dispersion. Among the thickening agents which may be used are, for example, sodium carboxymethyl cellulose and carboxy vinyl polymers such as the methyl vinyl ether maleic anhydride resins and ethylene maleic anhydride resins.

Other materials which may be employed in the compositions of this invention are finely divided abrasive materials used heretofore in wax polish compositions. Examples of suitable abrasive materials are diatomaceous earths, Neuberg chalk, amorphous silica and aluminum silicates. Generally, the amount of abrasive employed ranges from about 3 to 20 percent and more preferably from about 5 to 15 percent by weight based on the weight of the composition.

The polish compositions may also contain organopolysiloxane fluids or resins or mixtures thereof. Organopolysiloxanes which may be employed may be either triorganosiloxy end-blocked organopolysiloxane fluids, that is those having an R:Si ratio of from 1.9:1 to 2.1:1 or they may be organopolysiloxane resins having an R:Si ratio of from about 1.1:1 to about 1.7:1, wherein R is the same as R above. These organopolysiloxane fluids are prepared by the usual methods and it is to be noted that the invention is not limited to the method of preparation either of the fluid or the resin.

The viscosity of the organopolysiloxane fluids may range from about 10 to 500,000 cs. at 25°C. and more preferably from about 500 to 100,000 cs. at 25°C.

Generally, the organopolysiloxane resins are employed as a solution in an organic solvent or a mixture of compatible solvents.

The organopolysiloxane fluids and resins may each be present in an amount of from 0 to 10 percent by weight and more preferably from about 0 to 5 percent by weight based on the weight of the polish compositions. For many purposes, it is preferred that only organopolysiloxane resins be employed in the polish compositions.

Solvents which may be employed in these compositions are hydrocarbon solvents such as petroleum fractions, for example, petroleum naphtha, kerosene and white spirits. Examples of suitable halogenated hydrocarbon solvents are carbon tetrachloride, perchloroethylene, trichloroethylene and 1,1,2,-trichloroethane. The amount of solvent used will, of course, depend on the proportions of solids present and on the consistency desired and hence may vary widely. Thus, in a composition which is a solvent dispersion no water is present, while in a water-based emulsion, water may be present in an amount up to about 90 percent by weight based on the weight of the composition.

Various embodiments of this invention will be illustrated in the following examples; however, these examples are given by way of illustration and not by way of limitation. All parts are by weight unless otherwise specified.

EXAMPLE 1

The aminofunctional silicon fluid is prepared by heating a mixture containing about 600 parts of octamethylcyclotetrasiloxane, 11.1 parts of B-(aminoethyl)-r-aminopropyltrimethoxysilane and 0.15 part of potassium hydroxide to a temperature of 150°C. for three hours. After cooling the liquid product to room temperature, 0.2 part of acetic acid is added to neutralize the catalyst. The product is filtered and a liquid product having a viscosity of about 40 cs. at 25°C. is recovered. Nuclear Magnetic Resonance (N.M.R.) analysis indicates that the ratio of $CH_2O:OSi(CH_3)_2$ is about 1:48.

A polish composition is prepared by heating the following ingredients to a temperature of about 85°C.

| Composition (A) | Parts |
|---|---|
| Carnauba wax | 2.0 |
| Trimethylsiloxy endblocked dimethylpolysiloxane fluid (viscosity 350 cs. at 25°C.) | 2.5 |
| Kerosene | 5.0 |
| Oleic acid | 2.0 |
| Aminofunctional silicone fluid (Preparation described above) | 2.0 |
| Mineral spirits | 26.5 |
| Snow Floss (available from Johns-Manville Corporation) | 11.1 |

| Composition (B) | Parts |
|---|---|
| Morpholine | 0.9 |
| Water | 40.0 |

| Composition (C) | Parts |
|---|---|
| Acrylsol 60 (available from Rohm and Haas, Inc.) | 2.0 |

Composition (B) consisting of the above ingredients is heated to a temperature of 85°C. and then mixed with Composition (A) above.

Composition (C) is then added to the above mixture with agitation and then cooled to room temperature.

The surface of a metal panel used in the manufacture of automobile bodies and having a black lacquer finish is thoroughly cleaned with a solvent and an abrasive. The polish composition prepared above is applied to one half of the panel surface.

After storing for about 12 hours at room temperature, the panel is washed with a detergent-containing solution in 15 second increments of time. The time required for the waxed portion of the panel to achieve substantially the same gloss as the unwaxed portion is illustrated in the Table.

EXAMPLE 2

A polish composition is prepared in accordance with Example 1 except that 5 parts of a methyl silicone resin in a 50 percent solids solution in toluene and having a $CH_3:Si$ ratio of about 1.1 to 1 is added to the formulation. The results are illustrated in the Table.

EXAMPLE 3

A polish composition is prepared in accordance with Example 1 except that 5 parts of trimethylsiloxy endblocked dimethylpolysiloxane fluid (viscosity 350 cs. at 25°C.) and 5 parts of a methyl silicone resin are added to the formulation. The results are illustrated in the Table.

EXAMPLE 4

A polish composition is prepared in accordance with Example 1 except that 2 parts of a hydroxyl terminated dimethylpolysiloxane (viscosity 20,000 cs. at 25°C.) are added to the formulation. The results are illustrated in the Table.

EXAMPLE 5

A polish composition is prepared in accordance with Example 1 except that 5 parts of a hydroxyl terminated dimethylpolysiloxane having a viscosity of 20,000 cs. at 25°C. are added to the formulation. The results are illustrated in the Table.

EXAMPLE 6

A polish composition is prepared in accordance with Example 1 except that 1 part of methyl silicone resin in a 50 percent solids solution in toluene and having a $CH_3:Si$ ratio of about 1.1:1 and 33 parts of mineral spirits are added to the formulation. The aminofunctional silicon fluid is omitted from this formulation. The results are illustrated in the Table.

EXAMPLE 7

In a comparison example, a polish composition is prepared in accordance with the formulation of Example 1 except that the aminofunctional silicon fluid is omitted. The results are illustrated in the Table.

EXAMPLE 8

For purposes of comparison a mixture consisting of 2.5 parts of an aminosilane of the formula $(C_2H_5O)_2Si(OC_2H_4NH_2)_2$ and 200 parts of a hydroxyl terminated dimethylpolysiloxane fluid (viscosity 2,000 cs. at 25°C.) is substituted for the aminofunctional silicon fluid in the formulation of Example 1. The results are illustrated in the Table.

The following Table illustrates the detergent resistance of the polish compositions described in the above examples.

TABLE

| Example No. | Aminofunctional Silicon fluid | Silicone Resin | Polysiloxane Fluid** | OH-terminated dimethylpolysiloxane | Time required for polish removal |
|---|---|---|---|---|---|
| | Parts | Parts | Parts | Parts | |
| 1. | 2.0 | 0 | 2.5 | 0 | 4 minutes |
| 2. | 2.0 | 5.0 | 2.5 | 0 | 10 minutes |
| 3. | 2.0 | 5.0 | 5.0 | 0 | 10 minutes |

TABLE-continued

| Example No. | Aminofunctional Silicon fluid | Silicone Resin | Polysiloxane Fluid** | OH-terminated dimethylpolysiloxane | Time required for polish removal |
|---|---|---|---|---|---|
| | Parts | Parts | Parts | Parts | |
| 4. | 2.0 | 5.0 | 0 | 2.0 | 12 minutes |
| 5. | 2.0 | 0 | 2.5 | 5.0 | 6 minutes |
| 6. | 0 | 1.0 | 2.0 | 0 | 1.5 minutes |
| 7. | 0 | 0 | 5 | 0 | 0.25 minutes |
| 8. | 6.0* | 0 | 2.5 | 0 | 1 minute |

*Mixture of aminosilane and OH-terminated dimethylpolysiloxane.
**Trimethylsiloxy endblocked dimethylpolysiloxane.

Although specific examples of the invention have been described herein, it is not intended to limit the invention solely thereto, but to include all the variations and modifications falling within the spirit and scope of the appended claims.

What is claimed is:

1. In a polish composition comprising wax and a dispersing vehicle, the improvement which comprises incorporating therein at least 1 percent by weight of an aminofunctional silicon fluid, said aminofunctional silicon fluid is prepared by equilibrating at a temperature of from 25° C. to 200° C. a cyclic organopolysiloxane in which the organo groups are selected from the class consisting of monovalent hydrocarbon radicals and halogenated monovalent hydrocarbon radicals having up to 18 carbon atoms and an aminofunctional silicon compound represented by the formula

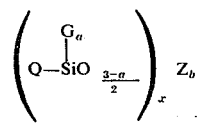

wherein G is selected from the group consisting of R, OR'', OSiR$_3$ and OR'''NR''$_2$ in which R is selected from the group consisting of movalent hydrocarbon radicals having from 1 to 18 carbon atoms and halogenated monovalent hydrocarbon radicals, R'' is selected from the group consisting of hydrogen and monovalent hydrocarbon radicals having from 1 to 18 carbon atoms, R''' is selected from the group consisting of divalent hydrocarbon radicals, divalent hydrocarbonoxy radicals in which the oxygen is in the form of an ether linkage and unsaturated divalent hydrocarbon radicals, Q is selected from the group consisting of R''$_2$NR'''—,

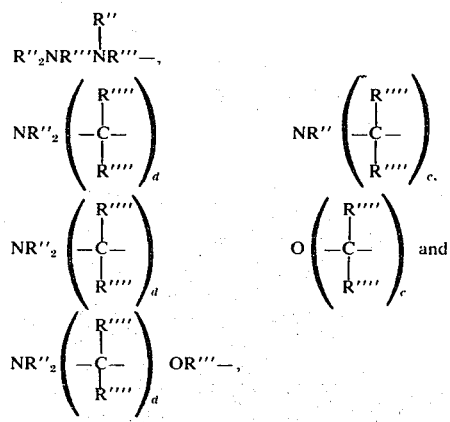

R'''' is selected from the group consisting of R and hydrogen, Z is selected from the class consisting of R''O$_{0.5}$, R$_3$SiO$_{0.5}$ and R''NR'''O$_{0.5}$, $a$ is a number of from 0 to 2, $b$ is a number of from 0 to 3, $c$ is a number of from 1 to 10, $d$ is a number of from 1 to 10 and $x$ is a number of from 1 to 20,000 in the presence of a basic catalyst.

2. The polish of claim 1 which contains from 1 to 10 percent by weight based on the weight of the composition of an organopolysiloxane resin in which the organic groups are selected from the class consisting of alkyl and phenyl radicals and the organic to Si ratio is from 1:1 to 1.7:1.

3. The polish of claim 1 which contains from 1 to 30 percent by weight based on the weight of the composition of a hydroxyl-terminated organopolysiloxane fluid having a viscosity of from 100 cs. to 1,000,000 cs. at 25°C.

4. The polish of claim 1 wherein the vehicle is an organic solvent.

5. The polish of claim 1 wherein the vehicle is water.

6. The polish of claim 1 which is in the form of a paste.

7. The polish composition of claim 1 wherein the cyclic siloxane has the formula

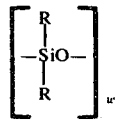

wherein R is a monovalent hydrocarbon radical having from 1 to 18 carbon atoms and $w$ is a number of from 3 to 10.

8. The polish composition of claim 1 which contains from 1 to 10 percent by weight of an organopolysiloxane fluid having a viscosity of from 10 to 500,000 cs. at 25°C.

9. The polish composition of claim 1 wherein the amino-functional fluid is present in an amount of from 1 to 15 percent by weight based on the weight of the composition.

10. The polish composition of claim 1 which contains the aminofunctional fluid in an amount of from 1 to 5 percent by weight based on the weight of the composition and from 1 to 5 percent by weight of a methyl silicone resin having a CH$_3$:Si ratio of 1.1:1 to 1.7:1.

11. The polish composition of claim 10 which contains from 1 to 15 percent by weight of a hydroxyl-terminated dimethylpolysiloxane fluid having a viscosity of from 50 to 1,000,000 cs. at 25°C.

* * * * *